United States Patent [19]

Kernion et al.

[11] 4,431,744

[45] Feb. 14, 1984

[54] CARBON BONDED REFRACTORY BRICK

[75] Inventors: Mark C. Kernion, Braddock; David J. Michael, White Oak, both of Pa.

[73] Assignee: Dresser Industries, Inc., Dallas, Tex.

[21] Appl. No.: 384,319

[22] Filed: Jun. 2, 1982

[51] Int. Cl.$^3$ .............................................. C04B 35/52
[52] U.S. Cl. .................................... 501/99; 501/100; 501/101; 501/108; 501/109; 501/110
[58] Field of Search ................. 501/99, 100, 101, 109, 501/110

[56] References Cited

U.S. PATENT DOCUMENTS

| | | | |
|---|---|---|---|
| 4,036,798 | 7/1977 | Hoppe et al. | 501/99 |
| 4,210,453 | 7/1980 | Bowers | 501/101 |
| 4,216,020 | 8/1980 | Watanabe et al. | 501/99 |
| 4,292,082 | 9/1981 | Danjyo et al. | 501/101 |

Primary Examiner—James Poer
Attorney, Agent, or Firm—Raymond T. Majesko

[57] ABSTRACT

Carbon bonded refractory brick containing 1 to 6% by weight liquid thermosetting resin binder consisting of polyhydroxydiphenyl resin and a curing agent and the balance being refractory aggregate.

5 Claims, 1 Drawing Figure

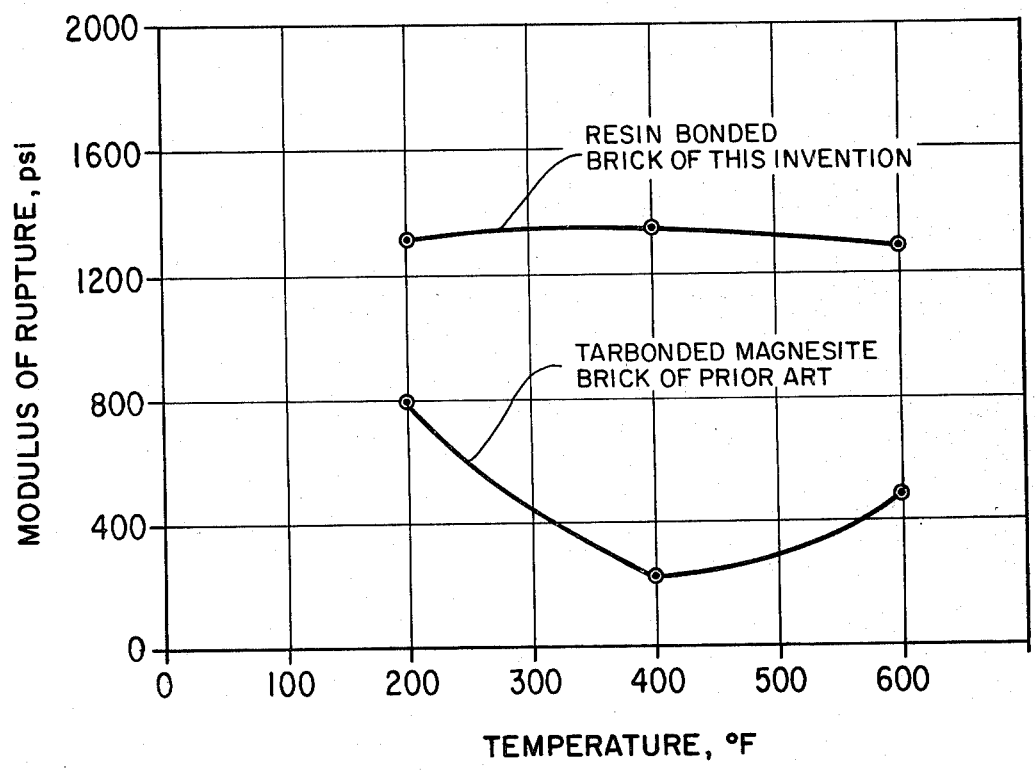

CARBON BONDED REFRACTORY BRICK

BACKGROUND OF THE INVENTION

This invention relates to carbon bonded refractory brick and, more particularly, to such brick having particular utility for lining various metal making furnaces.

Carbon bonded refractory brick have been used for some time in basic oxygen steel making furnaces and electric arc steel making furnaces because such brick have excellent properties of corrosion resistance and resistance to disintegration. Typically, in carbon bonded refractory brick of the prior art, tars and pitches have been used as binders for the refractory aggregates. The binders serve to bond the material, forming the refractory aggregates together during pressing, and to leave a carbon residue during operating life of the furnace incorporating the brick. Typically, the refractory aggregate comprises combinations of carbon bearing material and magnesite.

The use of tars and pitches as binders has certain undesirable consequences both in the manufacturing of the refractory and in its service life. For example, pitch bonded refractories must be produced by heating the batches of the aggregate material since, at room temperature, pitch is a solid. To produce a satisfactory brick, the pitch must be used in a molten state and mixed with the refractory aggregate. Generally, the pitch is placed in a molten state when heated to a temperature between 250° to 400° F. By heating the pitch to place same in a molten state, a substantial amount of fumes is produced. This may have an adverse affect on the health and, due to the nauseous odor, also on the morale of the workers in the plant making the refractory brick. Further, heating the batch of aggregate and pitch utilizes a significant quantity of energy.

When pitch bonded refractories are placed in service, the pitch will again soften when the operating temperature of the furnace falls within the temperature range of 200° to 600° F. During the burn-in and early heating of a newly lined furnace, as for example in the cone of a basic oxygen furnace, the brick could be subject to fragmental breaking or spalling due to the softening of the pitch.

To avoid the health and operating problems associated with the utilization of pitch or tar as a binder, resin substitutes for the pitch and tar have been sought. The suitable resins which have been utilized include phenolformaldehyde type (novolaks and resols), furan type, and lignin modified phenolics to name a few. Heretofore, the major disadvantage of using resin binders instead of tars and pitches in the production of carbon bonded refractories has been the cost of the resin. Also, the density and porosity of the resin bonded brick after coking has not been of the same quality as tar bonded brick. Further, many liquid resins which have been used have been fairly viscous materials which require slight heating prior to production of the brick.

SUMMARY OF THE INVENTION

Accordingly, it is an object of this invention to replace pitch and tar as a bonded agent in carbon bonded refractory brick.

It is a further object of this invention to utilize a relatively inexpensive, low viscosity, water soluble resin as a bonding agent in carbon bonded refractory brick.

These and other objects of the present invention are attained in carbon bonded refractory brick containing 1 to 6%, by weight, liquid thermosetting resin binder consisting of polyhydroxyldiphenyl resin and a curing agent; and the balance being refractory aggregate.

BRIEF DESCRIPTION OF THE DRAWING

The single FIGURE of the drawing graphically illustrates one advantage achieved through the use of the present invention as compared to the prior art (tar and pitch binders).

DESCRIPTION OF THE PREFERRED EMBODIMENT

The present invention provides a carbon bonded refractory brick containing from 1 to 6%, by weight, liquid thermosetting resin consisting of polyhydroxyldiphenyl resin and curing agent and the balance being refractory aggregates such as magnesia, alumina or carbon bearing materials such as carbon or thermal black, flake or amorphous graphite, petroleum coke, calcined anthracite coal or others. The carbon content of the refractory brick can range from 1 to 50%, preferably 1 to 35%, by weight.

The polyhydroxydiphenyl resin is formed as a by-product from the production of resorcinol. The preferred resin is composed of di- and tri-hydroxydiphenyl organic groups along with resorcinol and other high molecular weight polymers. The resin may be commercially obtained from the Koppers Company, which sells the resin under the trademark "Penacolite Resin RM-441".

The resin functions as a binder during the manufacture of the refractory brick and as a carbon precursor during the service life of the brick. The curing agent preferred for use in the resin is hexamethylenetetramine. The preference for this material stems from its effectiveness in the curing and eventual pyrolysis of the resin into a carboneous material. Other agents may be used which include paraformaldehyde, formalin, and acetal resin to name a few. The resin, in the 65% solids, 35% water range is very fluid at room temperature. Since the resin binder will cure to a thermoset material, it alleviates the problems of the prior art utilization of pitch as a binder; specifically, the problem associated with the pitch softening when the refractory brick is heated between 200° to 600° F. Further, since the above described resin is in a liquid state at room temperature, the batch material utilized in manufacturing brick does not require heating as has been the case when pitches, tars or other viscous resins have been used as the bonding agents. Also, this resin is water soluble and considerably less expensive than other resins which have been utilized.

The essence of the present invention will be apparent from the following examples which constitute the best presently known mode for the production of such carbon bearing brick.

EXAMPLE I

Carbon bonded refractories, which have primary use in basic oxygen steelmaking furnaces, were prepared from batches made up of 100 parts dead-burned magnesite, ranging from −2 mesh to ball mill fines, 3.2 to 3.8 parts thermal black, 3.6 to 4.5 parts resin (the polyhydroxydiphenyl type), and 0.28 to 0.33 parts hexamethylenetetramine.

The batches were mixed in two ways. In one case, a muller type mixer was employed in which the coarse fractions of the magnesite along with the thermal black and "hexa" were dry mixed for 1 minute. The resin was then added to the mixer followed by the ball mill fines; total mixing time was 8 minutes. In the other case, a high intensity mixer was used. All of the material was charged into the mixer at one time and mixing occurred for 5 or 8 minutes. Brick pressed from these batches were tempered in ovens at 500° F. with a hold time of 3 hours. The refractories produced from these mixes were tested and their properties are set forth in Table I. For purposes of comparison, the equivalent properties of refractory brick made with coal tar pitch and a phenol-formaldehyde novolak resin are set forth in Table II.

TABLE I

| Mix Designation | 1 | 2 | 3 | 4 |
|---|---|---|---|---|
| Mix | | | | |
| Deadburned Magnesite | | 100 parts | | |
| Polyhydroxydiphenyl resin, % by weight | 4.5 | 4.1 | 4.1 | 3.6 |
| Hexamethylenetetramine, % by weight | 0.33 | 0.32 | 0.32 | 0.28 |
| Thermal Black | 3.3 | 3.6 | 3.6 | 3.8 |
| Mixer Type | | Muller | | High Intensity |
| Bulk Density, pcf | 192 | 190 | 194 | 194 |
| Modulus of Rupture, psi | | | | |
| At room temperature | 3200 | 2720 | 2930 | 1840 |
| At 200° F. | — | — | — | 1330 |
| At 400° F. | — | — | — | 1350 |
| At 600° F. | 1990 | 1530 | 1990 | 1310 |
| At 2000° F. | — | — | — | 1370 |
| Coked Porosity, % | 10.8 | 10.8 | 8.68 | 9.6 |
| Ignited Porosity, % | 17.7 | 17.8 | 15.9 | 17.0 |
| Residual Carbon, % | 4.67 | 5.05 | 4.84 | 5.02 |
| Carbon Yield, % | 76.2 | 80.3 | 78.5 | 78.7 |
| Loss of Ignition, % | 6.04 | 6.21 | 6.08 | 6.30 |
| Relative Raw Stock Cost for One Ton of Brick Batch (Using pitch bonded as the standard) | — | — | — | 1.033 |

TABLE II

| Mix Designation | 1 | 2 |
|---|---|---|
| Mix | | |
| Deadburned Magnesite | 100 parts | |
| Coal Tar Pitch (180° F.) | 3.2 | — |
| Phenol Formaldehyde Novolak Resin | — | 4.00 |
| Sulfur | 0.74 | — |
| Hexamethylenetetramine | — | 0.29 |
| Carbon Black | 2.80 | 3.24 |
| Mixer Type | | Eirich |
| Bulk Density, pcf | 194 | 193 |
| Modulus of Rupture, psi | | |
| At Room Temperature | 1380 | 2800 |
| At 200° F. | 790 | 1940 |
| At 400° F. | 230 | 2070 |
| At 600° F. | 590 | 2360 |
| At 2000° F. | — | 1230 |
| Coked Porosity, % | 8.7 | 10.2 |
| Ignited Porosity, % | 15.9 | 17.0 |
| Residual Carbon, % | 4.86 | 4.72 |
| Loss on Ignition, % | 6.14 | 6.50 |
| Relative Raw Stock Cost for One Ton of Brick Batch (Using Pitch Bonded as the Standard) | 1 | 1.125 |

To illustrate one advantage using the resin described herein, a graph, FIG. 1, has been generated in which the modulus of rupture has been measured over the temperature range of 200° F. to 600° F. for the resin bonded brick of the present invention, and tar bonded brick made with 180° F. coal tar pitch. The curve labeled A was generated from the data set forth in column 4 of Table I, whereas curve B has been generated from the properties set forth in column 1 of Table II. The respective curves illustrate the high strength of the resin bonded brick in the temperature range of 200° F. to 600° F. The pitch bonded brick has decreasing strength in the above noted temperature range as the pitch softens and melts in this range, whereas resin, being a thermoset material, does not melt.

A further advantage of using the resin described herein over other typical resins, such as the phenol-formaldehyde novolak used in Table II, Mix 2, is shown by the raw stock cost for one ton of brick batch. Using the pitch bonded brick (which is the least expensive) as the standard, the relative cost for the phenolformaldehyde resin bonded brick is 12.5% higher than the standard while the resin bonded brick of the present invention is only 3.3% higher than a tar bonded composition.

Another advantage of the resin described herein over previously used resins is seen in the coked porosity values. Data given in column 3 of Table I shows that resin bonded brick, produced with the resin of this invention, can be produced to exhibit the same quality as the tar bonded brick in terms of coked porosity (see column 1, Table II). The phenolformaldehyde resin bonded brick had coked porosity considerably higher (see column 2, Table I).

Having thus described the invention in detail and with sufficient particularity as to enable those skilled in the art to practice it, what is desired by Letters Patent is set forth in the following claims.

The embodiments of the invention in which an exclusive property or privilege is claimed are defined as follows:

1. Carbon bonded refractory brick containing 1 to 6%, by weight, liquid thermosetting resin binder consisting of polyhydroxyldiphenyl resin and a curing agent and the balance being refractory aggregate.

2. Refractory of claim 1 characterized by said polyhydroxyldiphenyl resin ranging from 3.6 to 4.5%.

3. Refractory of claims 1 or 2 characterized by said refractory aggregate comprising magnesite, alumina, or carbon bearing materials.

4. Refractory of claim 1 wherein said curing agent is hexamethylenetetramine.

5. Refractory of claim 1 wherein said curing agent at least one selected from the group consisting of paraformaldehyde, formalin, acetal resin and any other organic material capable of reaction with said resin and causing the material to be thermoset.

* * * * *